United States Patent
McCrea et al.

(10) Patent No.: US 7,040,552 B2
(45) Date of Patent: May 9, 2006

(54) SUSPENDED BOOM WITH GAUGE MEMBERS

(76) Inventors: David Gary McCrea, Box 9, Benito, MB (CA), R0L 0C0; Thomas Edward McCrea, Box 9, Benito, MB (CA), R0L 0C0

( * ) Notice: Subject to any disclaimer, the term of this patent is extended or adjusted under 35 U.S.C. 154(b) by 172 days.

(21) Appl. No.: 10/687,149

(22) Filed: Oct. 15, 2003

(65) Prior Publication Data

US 2004/0129798 A1 Jul. 8, 2004

(30) Foreign Application Priority Data

Oct. 16, 2002 (CA) .......................................... 2408407

(51) Int. Cl.
*B05B 1/20* (2006.01)

(52) U.S. Cl. ...................... 239/167; 239/168; 239/159; 212/245; 212/250; 212/272; 52/114; 52/115

(58) Field of Classification Search ......... 239/159–170, 239/172–176, 722–754; 74/473.18; 212/261, 212/272, 245, 250, 195–204; 188/378; 267/136; 414/719, DIG. 417
See application file for complete search history.

(56) References Cited

U.S. PATENT DOCUMENTS

| 3,952,509 | A |   | 4/1976  | Coleman    |         |
|-----------|---|---|---------|------------|---------|
| 3,972,476 | A |   | 8/1976  | Hall       |         |
| 4,368,806 | A |   | 1/1983  | Raineri    |         |
| 4,709,857 | A | * | 12/1987 | Wilger     | 239/164 |
| 4,739,930 | A |   | 4/1988  | Pask       |         |
| 4,878,616 | A | * | 11/1989 | Richardson | 239/167 |
| 5,249,421 | A |   | 10/1993 | Lunzman    |         |
| 5,348,226 | A |   | 9/1994  | Heiniger et al. |    |
| 5,419,129 | A |   | 5/1995  | Becker et al. |      |
| 5,630,547 | A |   | 5/1997  | Klemenhagen et al. | |
| 5,701,933 | A |   | 12/1997 | Lunzman    |         |
| 5,988,528 | A |   | 11/1999 | Krohn et al. |       |
| 6,053,419 | A | * | 4/2000  | Krohn et al. | 239/1 |

OTHER PUBLICATIONS

Bill Strautman, Mid–Mounted Suspended Boom Reduces Stress Points, *The Western Producer Farming Magazine*, Mar. 2002, pp. 3–6,The Western Producer, Saskatoon, Saskatchewan, Canada.

New Holland CX Combine Manual, front cover, index and pp. 3–20, Jul. 2001.

New Holland TX–66 Combine Manual, front cover, index and pp. 4–2 through 4–7, May 1997.

NORAC Weighing & Control Systems, UC3 Sprayer Boom Control Operator's Manual, including except of relevant pp. 16–17, 1999.

* cited by examiner

*Primary Examiner*—Dinh Q. Nguyen
(74) *Attorney, Agent, or Firm*—Frost Brown Todd LLC

(57) ABSTRACT

An applicator boom apparatus comprises an applicator boom extending laterally from a vehicle, and pivotally attached to the vehicle such that the boom can pivot up and down with respect to the vehicle. A kit provides a gauge member adapted to ride along a surface of the ground and support an outer portion of the boom such that the boom moves up and down with the gauge member as the gauge member rides along the ground, and also provides an active hydraulic source powering the shoulder hydraulic cylinder of the apparatus such that the shoulder hydraulic cylinder exerts an upward force on the boom such that a downward force exerted on the gauge member by the boom is reduced.

11 Claims, 3 Drawing Sheets

SUSPENDED BOOM WITH GAUGE MEMBERS

This invention is in the field of applicators for applying agricultural materials such as fertilizer, herbicides, and pesticides on fields, as well as for various industrial and commercial uses, and in particular the laterally extending booms on such applicators.

BACKGROUND

In agricultural seeding operations agricultural materials in liquid or dry granular form are spread over the surface of a field using an agricultural applicator. Liquid applicators are most commonly referred to as sprayers, while dry granular applicators are referred to as granular applicators. Typically such applicators comprise a central container carried on a frame supported on wheels, and applicator booms extending a considerable distance to each side so that a significant width can be covered in each pass. Applicator widths of 120 feet or more are common. The agricultural materials are carried from the container along the booms by a pump, air blast, or the like as is well known in the art.

Similar applicators are used in industrial and commercial applications for ground maintenance or treatment.

In conventional applicators traveling typically at speeds of 5–8 miles per hour (mph), the booms are generally supported by one or more gauge wheels such that the boom moves up and down on the gauge wheels to follow the ground. The gauge wheels prevent the boom from contacting the ground, and maintain the proper boom height to maintain even application as the terrain varies. The operation of such a conventional boom with gauge wheels to allow the boom to follow the ground is disclosed in U.S. Pat. No. 4,650,124 to Connaughty et al. In some applicators, a skid shoe or the like is used instead of a wheel to act as the gauge member.

High speed applicators have recently become very popular, as they reduce the application time considerably. These are designed to operate at relatively high speeds of 15 to 20 mph. Such high speed applicators use a "suspended boom" arrangement wherein the boom extends to the side supported only at the inner end, with no gauge members. Gauge members have not been commonly used on high speed applicators. The booms can be quite heavy and so considerable weight must be carried by the gauge members. This weight on the gauge members creates a significant rearward force, especially in soft soil. As applicator speed increases, the rearward force exerted by resistance of the gauge members traveling over the ground increases as well. The boom must be strong enough to overcome this resistance, requiring increased weight, and compounding the problem.

With a suspended boom, there is no resistance from gauge members. The disadvantage is that the height of the boom is not controlled except at its inside end where it is attached to the applicator frame. The outer end of the boom can contact the ground in uneven terrain, and as well the proper boom height is not maintained nearly as well as when gauge members are used.

To address this problem, it is common to provide individually controllable hydraulic cylinders, commonly referred to as "shoulder cylinders", attached between the frame and each boom such that each boom can be pivoted upward about its inner end, where it is pivotally attached to the frame. In this way the operator can control the height of the outer end of each boom independently, and maintain an appropriate boom height while going through ditches and similar terrain variations.

Considerable prior art has been addressed to alleviating the problems associated with suspended booms. For example, U.S. Pat. No. 4,427,154 to Mercil, U.S. Pat. No. 4,598,830 to Fletcher, U.S. Pat. No. 4,643,358 to Jackson, U.S. Pat. No. 5,348,226 to Heiniger et al., and U.S. Pat. No. 6,234,407 to Knight et al. disclose variations directed to improved performance of suspended boom applicators.

High speed applicators are commonly used in high standing crops at distances of four or more feet above the ground. At these higher boom heights, the problem of the outer end of the boom hitting the ground is much reduced, and the proper boom height is much more variable. Thus such high speed applicators with suspended booms are well suited for operations in more mature crops at increased boom heights, but are less effective and problematic at lower boom heights.

SUMMARY OF THE INVENTION

It is an object of the present invention to provide a suspended boom for liquid and dry applicators that overcomes problems in the prior art. It is a further object of the present invention to provide a kit to convert existing suspended applicator booms to ground following booms wherein the suspended boom is supported on a gauge member so that the boom can follow the ground, and wherein the weight carried by the gauge member is reduced by providing an upward biasing force on the boom, thereby reducing rearward forces on the gauge member.

The present invention provides, in an applicator apparatus comprising a vehicle adapted for movement along the ground, a conventional hydraulic source supplied by a pump from a hydraulic fluid reservoir, an applicator boom extending laterally from the vehicle and pivotally attached to the vehicle such that the applicator boom can pivot up and down with respect to the vehicle, an extendable hydraulic shoulder cylinder operatively connected between the vehicle and the applicator boom and connected to the conventional hydraulic source such that the shoulder cylinder moves in a first direction to lower the applicator boom when a valve control directs hydraulic fluid through a lowering conduit into a lowering port of the shoulder cylinder, and moves in an opposite second direction to raise the applicator boom when the valve control directs hydraulic fluid through a raising conduit into a raising port of the shoulder cylinder, a gauge member kit for attachment to the applicator apparatus. The kit comprises a gauge member adapted to ride along a surface of the ground and adapted for attachment to an outer portion of the applicator boom to support the applicator boom such that the applicator boom can move up and down with the gauge member as the gauge member rides along the ground. An active hydraulic circuit is adapted for operative connection to the raising conduit wherein an active operating pressure of the hydraulic fluid in the raising conduit can be controlled, and wherein hydraulic fluid can pass from the pump through the active hydraulic circuit to the raising conduit, and from the raising conduit through the active hydraulic circuit to the hydraulic fluid reservoir, whereby the shoulder cylinder extends and retracts in response to forces exerted thereon that are greater or less than a force exerted by the active operating pressure, and wherein the active operating pressure is controlled to allow the shoulder cylinder to extend and retract as required to allow the applicator boom to move up and down with the gauge member as the gauge member rides along the ground.

Thus once the kit is installed, the gauge members essentially "feel" the ground, but cause very little drag. The boom provides improved height control in high speed operations over the boom height controls of the prior art. The kit allows installation on existing prior art suspended boom applicators to economically improve their performance at lower boom heights. The kit can be configured for installation with closed center or open center hydraulic systems.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

Figure 1:
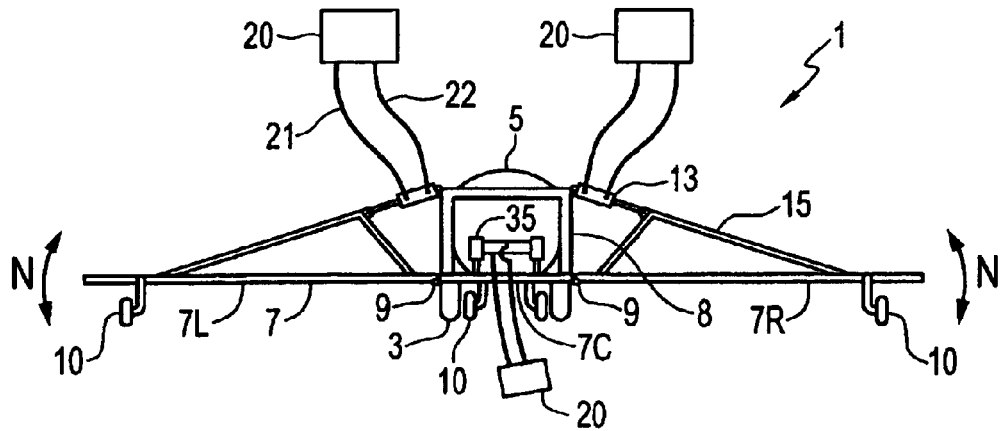
FIG. 1 is a rear view of an applicator apparatus.

FIG. 1 illustrates an agricultural applicator apparatus 1 comprising a vehicle 3 adapted for movement along the ground. Typically the vehicle 3 would be a self-propelled or tow behind trailer type sprayer or dry applicator. The vehicle 3 typically carries a tank 5 for carrying liquid or granular agricultural materials to be applied, and a pump, blower, or the like to distribute the agricultural materials across the width of the apparatus 1. Similar applicators are used in industrial and commercial applications for ground maintenance and treatment.

Left and right applicator booms 7L, 7R extend laterally from the vehicle, and are pivotally attached to the vehicle 3 at pivot points 9 on the boom frame 8 such that the booms 7 can pivot up and down with respect to the vehicle 3, as indicated by arrows N. A gauge member, illustrated as gauge wheel 10, supports an outer portion of each boom 7 such that the booms move up and down with the gauge wheels 10 as the gauge wheels roll along the ground. Typically the gauge wheels 10 will be castor wheels biased in a forward travel direction. The illustrated embodiments show a gauge wheel, but in some conditions it could be desirable to substitute a skid shoe or the like adapted to ride along a surface of the ground to act as the gauge member.

An extendable hydraulic shoulder cylinder 13 is pivotally connected at each end thereof between the vehicle 3 and the boom supports 15

An active hydraulic source 20 is operatively connected to each shoulder cylinder 13 by a raising conduit 21, and a lowering conduit 22. The active hydraulic source 20 supplies hydraulic fluid at an active operating pressure to the shoulder cylinder 13 such that the shoulder cylinder 13 extends and retracts in response to forces exerted thereon that are greater or less than a force exerted by the active operating pressure.

Figure 2:
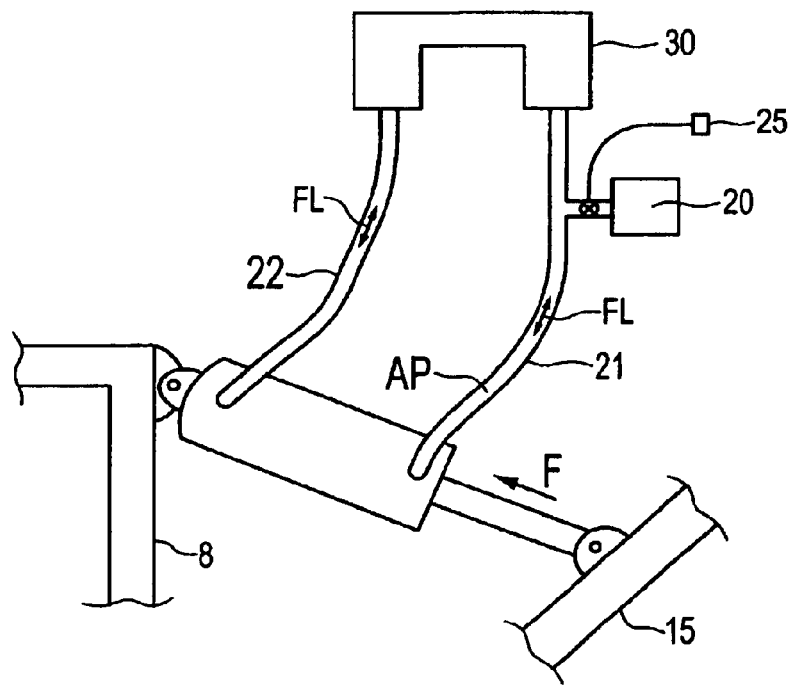
FIG. 2 is a schematic view of the connection of an active hydraulic source to the raising line of the shoulder cylinder.

As illustrated in FIG. 2, with an active operating pressure AP in the raising conduit 21, an upward force F is exerted on the boom support 15 and boom 7, with the result that the downward force exerted on the gauge wheel 10 by the boom 7 is reduced. The force F is not sufficient to overcome the total weight of the boom 7, but instead reduces the weight on the gauge wheel 10 so that the rearward force on the boom 7 caused by the drag of the wheel 10 is reduced. The active hydraulic source 20 allows hydraulic fluid to pass back and forth through the conduits 21, 22, as indicated by arrows FL, such that the shoulder cylinder 13 extends and retracts as required to allow the boom 7 to move up and down with the gauge wheel 10, floating as the gauge wheel 10 rolls along the ground.

The active operating pressure AP is adjustable, so that the upward force F on the boom 7 can be varied to suit boom design and application conditions.

A control 25 is provided so that the shoulder cylinder 13 can further be selectively connected to a conventional hydraulic source 30 instead of the active hydraulic source 20. When connected to the conventional hydraulic source 30, the shoulder cylinder 13 extends and retracts in response to a valve control, and the boom 7 pivots up and down as the shoulder cylinder 13 extends and retracts. The shoulder cylinder 13 thus provides position control of the boom 7 when in conventional mode.

The operator is thus able to switch the hydraulic system back and forth between the ground following mode provided by the active hydraulic source 20, and the position control mode provided by the conventional hydraulic source 30. The applicator apparatus 1 can then be used in ground following mode on short crops or bare fields with improved control of the boom height, and reduced risk of the booms hitting the ground. The gauge wheels 10 can be vertically adjustable to provide a necessary range of boom heights for a variety of nozzles, crop heights, and so forth. For use in tall crops, conventional position control mode is used, and the booms 7L, 7R are raised to the required height and the attached gauge wheels 10 can be raised off the ground. Since they carry very little weight, the gauge wheels 10 can be made quite light, such that they could be left in place during conventional operation. A mechanism could be provided to pivot the gauge wheels 10 up so they do not drag on the crop. Alternatively the gauge wheels 10 could simply be removed for conventional operations.

A center boom 7C is attached to the boom frame 8 and extends laterally substantially across a width of the vehicle 3 to cover the gap between the left and right booms 7L, 7R. The boom frame 8 is raised and lowered by hydraulic lift cylinders 35 to adjust the height of the center boom 7C and the inner ends of the booms 7L, 7R. The gauge wheels 10 are adjusted vertically so that the booms 7L, 7R, 7C are aligned at the proper height.

Although the frame is generally well supported at a suitable height by the wheels of the vehicle 3, a further gauge wheel 10 can be added to the center boom 7C, and the hydraulic lift cylinders 35 could be connected to an active hydraulic source to operate the center boom 7C in ground following mode as well. This center boom ground following capability would maintain the proper height of the center boom 7C, as well as the inner ends of the left and right booms 7L, 7R attached to the boom frame 8, when the wheels of the vehicle 3 sink into mud, for example. Also on some applicators, the suspension is not compensated so that the boom frame height changes somewhat when the tank goes from full to empty. Addition of float capabilities to the center boom provides a more stable boom height. The weight on the center gauge wheel 10 is small, such that same should not ordinarily sink into soft soil or mud to the same extent as the vehicle wheels which carry considerable weight.

Figure 3:
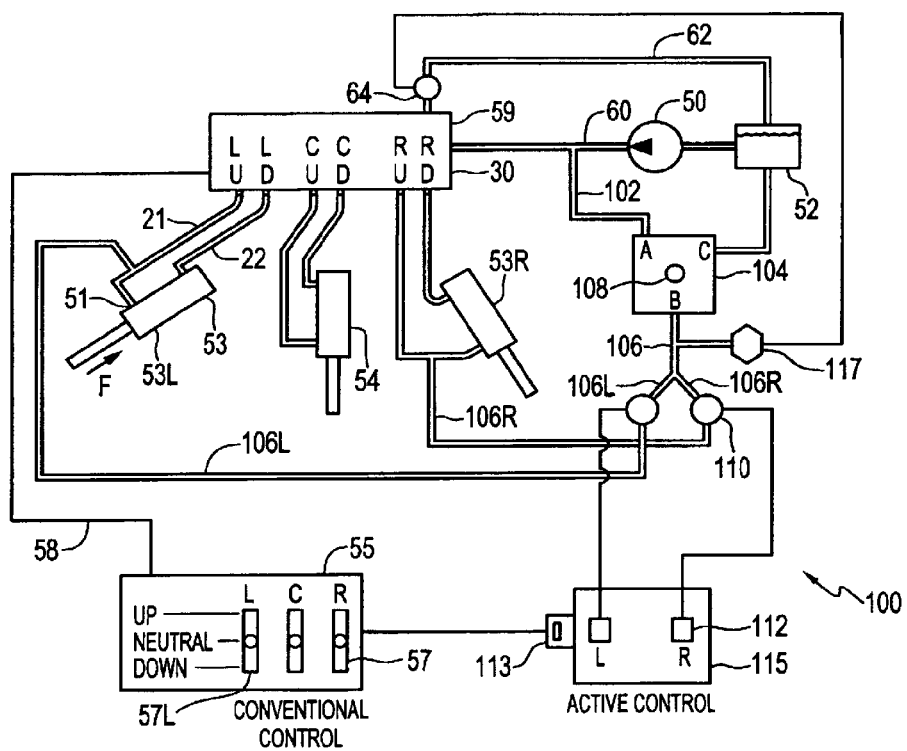
FIG. 3 is a schematic of an active hydraulic circuit of the invention connected to an applicator with an open center hydraulic system, where the center boom is conventional.

A typical agricultural applicator apparatus comprises, as illustrated in FIG. 3, a conventional hydraulic source 30 supplied by a pump 50 from a hydraulic fluid reservoir 52, and a pair of extendable hydraulic shoulder cylinders 53L, 53R operatively connected to the conventional hydraulic source 30 by raising conduits 21 and lowering conduits 22. Flow to the shoulder cylinders is controlled by a conventional electric valve control 55 comprising conventional switches 57 that are connected by electrical leads 58 to hydraulic block 59. The raising conduits 21 and lowering conduits 22 are connected to ports in the hydraulic block 59. The conventional control 55 also includes a switch 57 to control one or more center cylinders 54, also supplied from the conventional hydraulic source 30 as illustrated, to raise and lower the boom frame of the conventional applicator.

When the conventional switch 57L for the left shoulder cylinder 53L is moved to the up position, the raising conduit 21 of the left shoulder cylinder 53L is pressurized at the pump pressure and hydraulic fluid passes through the raising conduit 21 to the raising port on the left shoulder cylinder 53L causing it to retract and raise the left boom. When the conventional switch 57L is moved to the neutral position, the left shoulder cylinder 53L stops moving and the left boom remains in its position until the left shoulder cylinder 53L is again activated. Moving the conventional switch 57L to the down position causes the shoulder cylinder 53L to extend and move the boom down. The system for the right shoulder cylinder 53R operates in the same way. The conventional hydraulic source 30 thus provides positional control of the shoulder cylinders and thus the booms.

The kit of the present invention provides a gauge member for attachment to an agricultural applicator apparatus including such a conventional hydraulic source 30. The kit comprises a gauge member such as the gauge wheel 10 as seen in FIG. 1, typically attached to each boom 7L, 7R by clamps or the like such that they can be removed for conventional operation if desired.

The kit further comprises an active hydraulic circuit 100, shown generally on the right side of FIG. 3. The active hydraulic circuit 100 is adapted for operative connection through a T or the like to the raising conduit 21 of each shoulder cylinder 53L, 53R such that an active operating pressure of the hydraulic fluid in the raising conduit 21 can be controlled, and such that hydraulic fluid can pass from the pump 50 through the active hydraulic circuit 100 to the raising conduit 21, and from the raising conduit 21 back through the active hydraulic circuit 100 to the hydraulic fluid reservoir 52, whereby the shoulder cylinder 53L or 53R extends and retracts in response to forces exerted thereon that are greater or less than a force exerted by the active operating pressure. The active operating pressure is controlled at a pressure that allows the shoulder cylinder to extend and retract as required to allow the boom to move up and down with the gauge wheel as the gauge wheel rolls along the ground. In the embodiment illustrated in FIG. 3, the center cylinder 54 is not connected to the active hydraulic circuit 100, and operates only conventionally.

The active hydraulic circuit comprises a pressure line 102 teed into the output line 60 from the pump 50 to direct hydraulic fluid to the input port A of a pressure reducing relieving valve 104. The pressure reducing relieving valve 104 provides a reduced active pressure at active port B that is connected by active line 106 to left and right active lines 106L, 106R. The reduced active pressure can be varied by adjusting a pressure control 108 on the pressure reducing relieving valve 104. Excess hydraulic fluid is exhausted from the pressure reducing relieving valve 104 through exhaust port C to the hydraulic reservoir 52.

The active lines 106L, 106R are teed into the raising conduits 21 of the respective left and right shoulder cylinders 53L, 53R such that hydraulic fluid at the active pressure is present in the raising conduits 21. Each active line 106L, 106R includes an active valve 110 that can be opened or closed by right and left latching relays 112, located on active control 115 which are signaled from the corresponding conventional switches 57, which corresponds essentially to the control 25 in FIG. 2. Solid state and mechanical devices are also known that could provide the operation of the latching relays 112. An active switch 113 controls power to the latching relays 112 which corresponds essentially to the control 25 in FIG. 2.

Thus, in conventional mode the active switch 113 is in the off or valve closed position, and the conventional switches 57 can be used to control the boom height conventionally. In the active ground following mode, the active switch 113 is in the on or open valve position, and the conventional switches 57 are in the neutral position, and the up ports LU, RU on the hydraulic block 59 that conventionally supply the raising conduits 21 are closed. Hydraulic fluid at the active pressure can pass into and out of the raising ports 51 on the shoulder cylinders 53L, 53R.

The pressure reducing relieving valve 104 maintains the active pressure at a selected setting such that the upward force F is exerted on the boom and the weight of the boom carried by the gauge wheel is reduced. The pressure control 108 is adjusted so that the weight of the boom is greater than the upward force F, and the boom rides on the gauge wheel, following the contours of the ground. When the gauge wheel on one or the other boom moves down the corresponding shoulder cylinder extends, pushing hydraulic fluid back through the active line 106 through the active port B on the pressure reducing relieving valve 104 and out the exhaust port C. When the gauge wheel moves up, the shoulder cylinder retracts and hydraulic fluid flows from the active port B through the active line 106 into the raising port 51. Thus the force is maintained substantially constant at value F as the shoulder cylinder extends and retracts. The shoulder cylinder acts as a bias element exerting a constant upward force F on the boom that corresponds to the selected active pressure.

In some situations, the operator may need to quickly raise a boom to clear an obstacle or the like. In the illustrated embodiment, the conventional switches 57 are connected to the active control 115 such that when the conventional switch 57L is moved to the up position, the corresponding active valve 110 is closed, reverting the system for the left boom to conventional up operation. The right boom remains unaffected in ground following mode.

The connection between the conventional switches 57 and the active control 115 can be configured to override the active control and revert to conventional operation in a variety of ways. Typically the conventional switches 57 are of the type that return to neutral when released. By moving the conventional switch 57 to the up position, the operator overrides the active control and reverts to conventional operation. The operator can then move the selected boom up conventionally by holding the conventional switch 57 in the up position. Once the obstacle is cleared, the operator taps the conventional switch 57 for the selected boom to the down position to revert to active ground following mode, and the boom floats back down until the wheel rests on the ground. Alternatively, the operator could move the active switch 113 to the off position and back to the on position again to change to the ground following mode. Using this configuration, both booms would revert to conventional operation. Other configurations could be used as well.

The operator can control the system using the conventional switches 57 during normal operations, where a boom might need to raised to clear an obstacle. The operation is convenient, as the operator essentially operates the booms while traveling down the field in the same way as he would conventionally, with his hand located on the conventional controls.

The hydraulic system illustrated in FIG. 3 is an "open center" system wherein hydraulic fluid is pumped steadily by the pump 50 to the hydraulic block 59. When the conventional switches 57 are in neutral, the hydraulic fluid is bypassed through the hydraulic block 59 to return line 62 and thus to the hydraulic reservoir 52. The pressure on the output line 60 is thus very small, since the hydraulic fluid is merely circulating. In order to obtain sufficient pressure to operate the active hydraulic circuit, it is necessary to provide a return valve 64 in the return line 62 so that the return line 62 can be closed, and pressure will rise in the output line 60.

Hydraulic fluid is only drawn from the pump when the boom moves up retracting the corresponding shoulder cylinder 53. When the boom moves up, there is drop in the pressure in active line 106. A pressure sensor 117 is teed into the active line 106 such that when the active pressure drops, the valve 64 closes and pressure line 102 is pressurized and supplies the required hydraulic fluid at the required pressure to the pressure reducing relieving valve 104.

Figure 4:
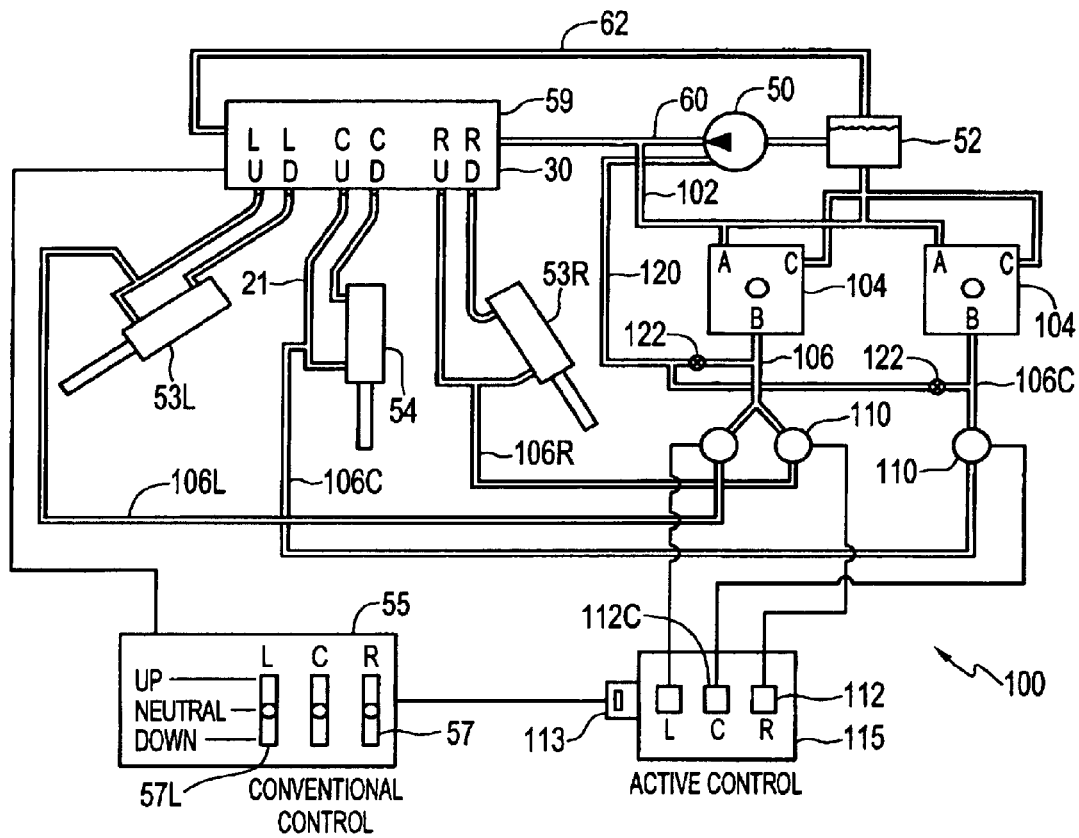
FIG. 4 is a schematic of an active hydraulic circuit of the invention connected to an applicator with a closed center hydraulic system where the center boom is floating.

FIG. 4 illustrates an embodiment for use on a closed center hydraulic system. In such systems, the pump 50 does not constantly circulate hydraulic fluid, but instead maintains pressure on the output line 60 at all times, with flow only as called for. Thus no pressure sensor or return valve is required. In a load sensing hydraulic system a load sensing line 120 is required tell the pump 50 what pressure to maintain in the system. One way check valves 122 are required in the load sensing line.

FIG. 4 shows a schematic hydraulic system of an embodiment wherein the center cylinder 54 that controls the height of the boom frame is also subjected to an upward force, and is supported on gauge wheels as in FIG. 1. A second pressure reducing relieving valve 104 is added in parallel with the existing pressure reducing relieving valve 104 of FIG. 3. Hydraulic fluid at an active pressure is thus supplied to the center active line 106C and through it to the raising conduit 21 of the center cylinder or cylinders 54. A latching relay 112C to control the active valve in the center active line is added to the active control 115. The center cylinder 54 and attached boom frame thus float in the same manner as the right and left booms. A separate pressure reducing relieving valve 104 is supplied to operate the center cylinder 54 so that a different active pressure can be selected for the outboard booms and for the boom frame. The same active pressure is satisfactory to operate the left and right booms since the weight of each boom is substantially the same. The weight of the boom frame can very substantially from one applicator to another, and the separate pressure reducing relieving valve 104 allows for independent adjustment of the active pressure.

Figure 5:
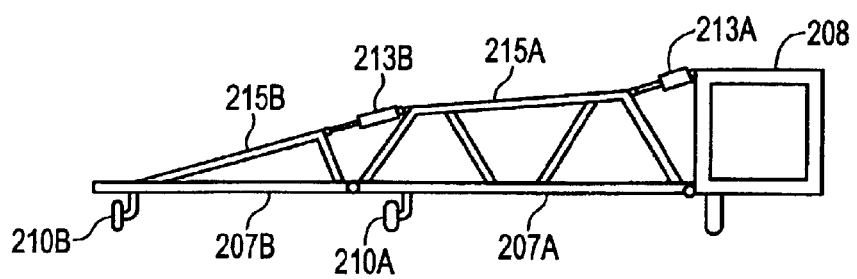
FIG. 5 is a rear view of the left side of an applicator apparatus comprising a segmented boom.

FIG. 5 shows an embodiment for operating a wider boom that is segmented into an inner boom section 207A, pivotally attached at its inner end to the boom frame 208, and an outer boom section 207B pivotally attached at its inner end to the outer end of the inner boom section 207A. An inner gauge wheel 210A supports an outer portion of the inner boom section 207A, and an outer gauge wheel 210B supports an outer portion of the outer boom section 207B. Inner shoulder cylinders 213A and outer shoulder cylinders 213B provide an upward force on respective inner and outer boom sections 207A, 207B. The weight carried by the inner and outer gauge wheels 210A, 210B is thus reduced, and the apparatus works in the same manner as described above. Again a separate pressure reducing relieving valve 104 is provided for the left and right outer boom sections to allow for independent selection of the upward force on the outer boom sections. It will be noted that increasing the upward force exerted by the outer shoulder cylinders 213B on the outer boom sections 207B will increase the weight of the inner boom sections 207A carried by the inner gauge wheels 210A, requiring increasing the upward force exerted by the inner shoulder cylinders 213A. Independent adjustment allows a suitable combination of active pressures to be attained.

The inner and outer boom sections 207A, 207B of FIG. 5 could be locked into alignment for conventional operation as a suspended boom.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

We claim:

1. In an applicator apparatus comprising a vehicle adapted for movement along the ground, a conventional hydraulic source supplied by a pump from a hydraulic fluid reservoir, an applicator boom extending laterally from the vehicle and pivotally attached to the vehicle such that the applicator boom can pivot up and down with respect to the vehicle, an extendable hydraulic shoulder cylinder operatively connected between the vehicle and the applicator boom and connected to the conventional hydraulic source such that the shoulder cylinder moves in a first direction to lower the applicator boom when a conventional valve control directs hydraulic fluid through a lowering conduit into a lowering port of the shoulder cylinder, and moves in an opposite second direction to raise the applicator boom when the conventional valve control directs hydraulic fluid through a raising conduit into a raising port of the shoulder cylinder, a gauge member kit for attachment to the applicator apparatus, the kit comprising:

a gauge member adapted to ride along a surface of the ground and adapted for attachment to an outer portion of the applicator boom to support the applicator boom such that the applicator boom can move up and down with the gauge member as the gauge member rides along the ground;

an active hydraulic circuit adapted for operative connection to the raising conduit wherein an active operating pressure of the hydraulic fluid in the raising conduit can be controlled, and wherein hydraulic fluid can pass from the pump through the active hydraulic circuit to the raising conduit, and from the raising conduit through the active hydraulic circuit to the hydraulic fluid reservoir, whereby the shoulder cylinder extends and retracts in response to forces exerted thereon that are greater or less than a force exerted by the active operating pressure, and wherein the active operating pressure is controlled to allow the shoulder cylinder to extend and retract as required to allow the applicator boom to move up and down with the gauge member as the gauge member rides along the ground;

an active control operative to switch the boom from conventional mode, wherein the conventional valve control directs hydraulic fluid through the raising conduit into the raising port of the shoulder cylinder and the active hydraulic circuit is disconnected, to active mode wherein the active operating pressure of the hydraulic fluid is present in the raising conduit.

2. The kit of claim 1 wherein the conventional valve control is an electric control.

3. The kit of claim 2 wherein when the boom is in the active mode and the conventional valve control is moved in a direction to conventionally raise the applicator boom, the active hydraulic circuit is disconnected and the boom moves up.

4. The kit of claim 3 wherein the conventional valve control is further moved in a direction to conventionally lower the applicator boom, the active hydraulic circuit is re-connected and the boom moves down.

5. The kit of claim 1 wherein the applicator apparatus further comprises:
   a boom frame attached to the vehicle, and right and left applicator booms pivotally attached to corresponding sides of the boom frame and corresponding right and left shoulder cylinders attached to the boom frame and corresponding applicator booms;
and wherein the kit further comprises:
   right and left gauge members adapted for attachment to corresponding right and left booms;
   wherein the active hydraulic circuit is adapted for connection to right and left raising conduits connected to the corresponding right and left shoulder cylinders.

6. The kit of claim 1 wherein the applicator apparatus further comprises:
   a boom frame attached to the vehicle, and wherein the applicator boom is pivotally attached to the boom frame and the shoulder cylinder is attached to the boom frame and applicator boom;
   a center boom attached to the boom frame and extending laterally substantially across a width of the vehicle;
   an extendable hydraulic center cylinder operatively connected between the vehicle and the boom frame and connected to the conventional hydraulic source such that the center cylinder moves in a first direction to lower the center boom when a center valve control directs hydraulic fluid through a center lowering conduit into a center lowering port of the center cylinder, and moves in an opposite second direction to raise the center boom when the center valve control directs hydraulic fluid through a center raising conduit into a center raising port of the center cylinder;
and wherein the kit further comprises:
   a center gauge member adapted for attachment to the center boom such that the center gauge member can ride along a surface of the ground supporting the boom frame such that the boom frame moves up and down with the center gauge member as the center gauge member rides along the ground;
   a center active hydraulic circuit adapted for operative connection to the center raising conduit wherein a center active operating pressure of the hydraulic fluid in the center raising conduit can be controlled, and wherein hydraulic fluid can pass from the pump through the center active hydraulic circuit to the center raising conduit, and from the center raising conduit through the center active hydraulic circuit to the hydraulic fluid reservoir, whereby the center cylinder extends and retracts in response to forces exerted thereon that are greater or less than a force exerted by the center active operating pressure, and wherein the center active operating pressure is controlled to allow the center cylinder to extend and retract as required to allow the center boom to move up and down with the center gauge member as the center gauge member rides along the ground;
   wherein the center hydraulic cylinder can be selectively connected to the conventional hydraulic source or to the second active hydraulic source.

7. The kit of claim 1 wherein the gauge member comprises a wheel.

8. The kit of claim 7 wherein the wheel is a castor wheel biased in a forward travel direction.

9. The kit of claim 1 wherein the applicator apparatus comprises a closed center hydraulic system.

10. The kit of claim 1 wherein the applicator apparatus comprises an open center hydraulic system.

11. An applicator apparatus comprising:
   a vehicle adapted for movement along the ground;
   a conventional hydraulic source supplied by a pump from a hydraulic fluid reservoir;
   an applicator boom extending laterally from the vehicle and pivotally attached to the vehicle such that the applicator boom can pivot up and down with respect to the vehicle;
   an extendable hydraulic shoulder cylinder operatively connected between the vehicle and the applicator boom and connected to the conventional hydraulic source such that the shoulder cylinder moves in a first direction to lower the applicator boom when a conventional electric valve control directs hydraulic fluid through a lowering conduit into a lowering port of the shoulder cylinder, and moves in an opposite second direction to raise the applicator boom when the conventional valve control directs hydraulic fluid through a raising conduit into a raising port of the shoulder cylinder;
   a gauge member adapted to ride along a surface of the ground and attached to an outer portion of the applicator boom to support the applicator boom such that the applicator boom can move up and down with the gauge member as the gauge member rides along the ground;
   an active hydraulic circuit operatively connected to the raising conduit such that an active operating pressure of the hydraulic fluid in the raising conduit can be controlled, and such that hydraulic fluid can pass from the pump through the active hydraulic circuit to the raising conduit, and from the raising conduit through the active hydraulic circuit to the hydraulic fluid reservoir, whereby the shoulder cylinder extends and retracts in response to forces exerted thereon that are greater or less than a force exerted by the active operating pressure;
   wherein the active operating pressure is controlled to allow the shoulder cylinder to extend and retract as required to allow the applicator boom to move up and down with the gauge member as the gauge member rides along the ground;
   an active control operative to switch the boom from conventional mode, wherein the conventional valve control directs hydraulic fluid through the raising conduit into the raising port of the shoulder cylinder and the active hydraulic circuit is disconnected, to active mode wherein the active operating pressure of the hydraulic fluid is present in the raising conduit;
   wherein when the boom is in the active mode and the conventional valve control is moved in a direction to conventionally raise the applicator boom, the active hydraulic circuit is disconnected and the boom moves up; and
   wherein when the conventional valve control is moved in a direction to conventionally lower the applicator boom, the active hydraulic circuit is re-connected and the boom moves down.

* * * * *